United States Patent [19]
Bugl et al.

[11] Patent Number: 5,107,792
[45] Date of Patent: Apr. 28, 1992

[54] ARRANGEMENT FOR KEEPING LIVESTOCK

[76] Inventors: Helmut Bugl, Graf Anselm Str. 4, 7407 Rottenburg 5; Josef Häufele, Sr.; Josef Häufele, Jr., both of Robert Bosch Str. 6-9, 7904 Erbach-Dellmensingen, all of Fed. Rep. of Germany

[21] Appl. No.: 732,746

[22] Filed: Jul. 18, 1991

Related U.S. Application Data

[63] Continuation of Ser. No. 652,451, Feb. 7, 1991, abandoned, which is a continuation of Ser. No. 339,092, Apr. 17, 1989, abandoned.

[30] Foreign Application Priority Data

Apr. 21, 1988 [DE] Fed. Rep. of Germany ....... 3813471

[51] Int. Cl.⁵ ............................................. A01H 1/00
[52] U.S. Cl. ....................................... 119/16; 119/20; 119/27
[58] Field of Search ................. 119/15, 18, 19, 20, 119/16, 27

[56] References Cited

U.S. PATENT DOCUMENTS

| | | | |
|---|---|---|---|
| 2,560,661 | 7/1951 | Poovey | 119/19 |
| 2,956,539 | 10/1960 | Boening | 119/17 |
| 3,159,139 | 12/1964 | Haggard et al. | 119/17 |
| 3,239,599 | 3/1966 | Torrey et al. | 119/19 |
| 3,338,213 | 8/1967 | Reynolds et al. | 119/16 |
| 3,464,388 | 9/1969 | Stout | 119/15 |
| 3,962,993 | 6/1976 | Dattilo | 119/19 |
| 3,991,717 | 11/1976 | Buchanan | 119/19 |
| 4,036,177 | 7/1977 | DeSmit | 119/18 |
| 4,205,627 | 6/1980 | Buchanan | 119/17 |
| 4,334,501 | 6/1982 | McDaniel | 199/16 |
| 4,343,304 | 8/1982 | Hickmann | 119/15 |
| 4,348,986 | 9/1982 | Marrs | 119/20 |
| 4,528,941 | 7/1985 | Spangler | 119/15 |
| 4,690,100 | 9/1987 | Thomas | 119/15 |
| 4,696,257 | 9/1987 | Neary et al. | 119/19 |
| 4,729,343 | 3/1988 | Evans | 119/19 |

FOREIGN PATENT DOCUMENTS 3310595 9/1984 Fed. Rep. of Germany .
3447753 6/1986 Fed. Rep. of Germany .

Primary Examiner—Paul J. Hirsch
Attorney, Agent, or Firm—Brooks Haidt Haffner & Delahunty

[57] ABSTRACT

An arrangement for keeping livestock, particularly pigs, in which the animals are kept individually or in groups in sleeping pens in such manner that they lie only adjacent to one another and predominantly only in one direction, but under certain circumstances also in opposed directions. The arrangement may provide air supply devices, air circulation devices and/or air discharge devices by which the air is processed according to the requirements of the animals. It is essential that on at least one side of the sleeping pen, an opening is provided through which the animal can at will move its head into a region outside the sleeping stall. The opening is provided with a simple or multiple curtain. The arrangement achieves the advantage that the warmer region surrounding the body of the animal is kept separate from the head and inhalation region and that the air conditions can be controlled separately in these regions.

28 Claims, 9 Drawing Sheets

ARRANGEMENT FOR KEEPING LIVESTOCK

This application is a continuation of application Ser. No. 07/652,451, filed Feb. 7, 1991, now abandoned, which is a continuation of application Ser. No. 07/339,092, filed Apr. 17, 1989, abandoned.

The invention relates to an arrangement for keeping livestock, particularly pigs, in which the animals are kept individually or in groups in sleeping pens in such manner that they lie only next to each other and predominantly only in one direction, but also under some circumstances in opposed directions, and air re-circulation, discharge, and/or supply devices can be provided by which the air can be processed according to the needs of the animals.

For keeping animals in stalls, particularly pigs, it is desired to make available a stall system which is as economical as possible.

In the latest stall systems, completely slotted floors are predominantly used, in which the excrement from the animals passes through the slots into receiving containers located beneath. The animals are as a consequence positioned continuously above their excrement, the odor of which reaches correspondingly high levels, so that animals with a particularly sensitive sense of smell, as is for example the case with pigs, cannot feel well in such an environment. It has been proved that a feeling of well-being and the associated weight increase of the animals are significantly improved if the environment of the stall is organised optimally.

In addition, in known stalls the temperature is almost constant day and night, certainly during the entire fattening period. In this connection, it is assumed that an optimum air temperature in the stalls is generally 16°–25° C. This constant temperature however does not correspond to the normal temperature requirements for living creatures.

The inhalation air in turn should be substantially lower during the sleep period than the temperature environment of the body. During the rest and sleeping period, the optimal inhalation air temperature is 10°–20° C., whilst the air temperature environment of the body should be about 30°–36° C. and should moreover have optimum humidity. From this, it can be seen that keeping of animals in stall systems of the latest type with the same inhalation and body air temperature is not conducive either to the health or to the feeling of well-being of the animals. If the inhalation air temperature is correct, then the temperature of the air environment of the body is too low and the energy expenditure in the body leads to loss of weight or to poor feed utilisation. At higher temperatures, in particular of the inhalation air, on the other hand the circulation of the animals is severely affected which leads to circulatory problems often with fatal results.

Stall systems have therefore been developed in which it is attempted to improve the environment in the stall by supply of fresh air and by heating. However, as a result the costs of keeping the animals increase considerably so that the profitability correspondingly reduces.

From DE-OS 33 10 595, an air system is known for improving the air environment in livestock holding stalls. In these stalls, the inhalation air is separated from the remaining air. In addition, the inhalation air is supplied via fresh air feed nozzles into the inhalation region of the animals, the air separation being achieved by means of a transverse membrane (sleeve) surrounding the neck of the animal. Furthermore, each fresh air feed nozzle is provided with an outlet tube for the controlled removal of the exhalation air. In the body air portion of the stall is provided a hot air nozzle with continuous air supply, thus high energy consumption, which contributes to stagnation of the air surrounding the body and increase of its temperature (bed system). The necessary sleeve-like partition wall however hinders freedom of movement of the animals. In a further embodiment of the known stall, a tethering device is provided to which the animal is tethered and which also must closely adjoin the body of the animal. As a result, the animal is likewise not permitted free movement either within or outside the stall.

An arrangement for keeping livestock of the above described type is known from DE-OS 34 47 753. In this, the respective sleeping pen has in the lower region of the end wall normally faced by the head of the animal, a relatively small opening via which the sleeping pen is connected to a device for supplying breathing air, a so-called breathing box. This breathing box is thus a part of the sleeping pen and both chambers are continuously coupled together. As experiments have shown, this arrangement is not particularly well accepted by the animals. One reason is to be seen in that the cooler breathing air exists not only in the inhalation region but extends into the entire inner volume of the sleeping pen, so that the danger exists that a temperature which is too low will occur in the sleeping pen. A further reason results from the unfavourable arrangement of the breathing box and/or the opening connecting the breathing box to the sleeping pen. As already mentioned, the latter is arranged in the end wall of the sleeping pen normally faced by the head of the animal and is located in the lower region of this end wall. This is intended to encourage the lying animal to place its head in the vicinity of this opening.

In order to stand up, however, the animal has to move backwards again in order to free itself from the end wall of the stall which naturally restricts forward standing movement of the animal. Finally, the known sleeping pen affords insufficient possibility of movement to the animal.

An object of the invention is to provide an arrangement for keeping livestock, in particular pigs, in which on the one hand separation between the part surrounding the body of the animal and the head and inhalation region is ensured and on the other hand freedom of movement for the animal is nevertheless maintained.

This object is achieved according to the invention in that the arrangement has a sleeping pen in which the opening is covered with a single or multiple curtain and is dimensioned such that the animal can move its head or body into a region outside the sleeping pen of its own volition.

This construction, that is to say providing the sleeping pen with an opening covered by a curtain, brings the great advantage that exact separation between the body region and the head or inhalation region of the animal is ensured. This separation permits the temperatures of the air, which on the one hand surrounds the body and on the other hand surrounds the head or nose of the animal, to be kept always separate from each other and mutually adapted such that they correspond to the requirements of the animal. On the one hand, by means of correspondingly adjusted inhalation air temperature, good utilisation of feed and good quality of the flesh from the animal raised is ensured. On the other hand, in the pen maintained separate from the inhalation region, in which the body of the animal lies during sleep or rest, the air space in the pen can be held as small as possible and necessary, whereby an optimum temperature for the animal is produced either from the body heat from the animal itself or with only small energy consumption (bed system).

The opening in the sleeping pen furthermore ensures that the animals can pass in and out unhindered and can lie with the head in the open during sleep or rest. As a result, the animals have the desired freedom of movement.

In the system according to the invention, preferably four differing sizes of sleeping pen are employed during the rearing period, such as for example for sucking pigs, maturing pigs, fattening and breeding. In the smallest sleeping pen, the piglets remain until they reach a weight of about 10 kilograms; up to 30 kilograms, the piglets are housed in the medium sized sleeping pen, whilst then the largest pen is used until a weight of 100 kilograms or more is reached.

The sleeping pen can be provided with more than one opening so that the pigs can have the choice of lying with the head towards one or the other end. In this connection, the body always lies in the sleeping pen with the head in the open with appropriatly adjusted inhalation and head air temperatures.

According to another development of the invention, the sleeping pen provides an independent head region in which warm draught-free air is produced uniformly surrounding the body of the animal, and being recirculated. Thus, the body of the animal in the sleeping pen is always surrounded with warm air whilst the animal can place its head outside through the curtain.

The re-circulation air can be in such manner that the same temperatures can be achieved throughout the sleeping pen. As a result of the fact that in the pen the air space around the animal is maintained only as long as necessary, the optimum environmental temperature for the body of the animal can be maintained with very low energy consumption. The openings of the inlet tube can be constructed as slots, holes or the like, according to the desired air speed and amount. Since only recirculated air is employed in the sleeping stall, the further advantage is achieved that the air is very dry. As a result, the warmth is very pleasant and no bacteria can develop in the sleeping pen.

In order further to meet the requirements of the animal concerned, no draughts may occur in the sleeping pen. For that reason, in the sleeping pen no supply of hot or fresh air is provided, but, as already mentioned, only re-circulation air. This leads to lower energy consumption and, since the openings are covered by curtains, practically no heat loss occurs.

According to another development of the inventive concept, the floor as well as the side walls and cover of the sleeping pen are formed to be heat insulating. By this means, at worst a low heat loss occurs through the walls of the sleeping pen and thus the energy consumption is low.

Additionally, the cover of the pen can be subdivided into one or more parts and one or more flaps can be provided for opening. According to another development of the inventive concept, the cover can be opened or closed by hand or automatically according to the requirements of the animals. Furthermore, the sleeping pen can also be provided on one end with an easily opened and closed flap. These arrangements simplify access to the interior of the sleeping pen in order for example to place new born piglets into the pen or to inspect the interior of the sleeping pen.

According to the invention, the sleeping pen can be provided with a soft lying surface in order to increase further comfort for the animals in the sleeping pen.

According to another development of the inventive concept, the curtain covering the opening can consist of lamellas arranged adjacent to one another and/or behind one another. All lamellas are moveable in order to permit the animals movement in and out as well as movement of the head into the inhalation region during sleeping or rest. The curtain is so constructed that when the animal is lying with its head in the open, the smallest possible amount of heat is lost and scarcely any cooler air is able to reach the warm body region. The curtain can have various heights and the individual lamellas can have various widths. For example, in the upper region of the curtain lamellas of larger width can be arranged and in the lower region of the curtain lamellas of smaller width can be provided. According to a further embodiment, the curtain can be constructed to be multi-layered or multiply-plied. In an embodiment with for example two curtains arranged one behind the other, the one curtain in the upper region of the opening of the sleeping pen is formed of lamellas of larger width and the other curtain in the lower region of the opening is formed of lamellas of smaller width. The other curtain can also overlap the one curtain and be arranged outside the one curtain. If for example the animals lie with their heads in the open, the wide upper lamellas hang vertically. The heads are located between the smaller longer lamellas, which contact the heads, in order to prevent loss of heat from the body region.

According to another development of the inventive concept, the recirculation air system is adapted for operating a single pen or several pens in common, in which connection, when several sleeping pens are driven in common, a central unit is employed for air processing. Furthermore, for controlling the recirculating air, in particular for several pens, a simple manually operable flap can be provided in the inlet and outlet pipe or an automatic control system can be provided.

The sleeping pen can if desired also be operated without recirculating air. The necessary heat for the pigs can then be produced with infrared lamps, heat radiators, hot air, floor heating and such heat sources. Heat distribution in the sleeping pen is in this connection however not as uniform as with warm recirculating air. Clear separation into a hot pen zone and a cool head region with colder air adjusted in temperature for inhalation, is however still ensured.

The arrangement can according to another development of the inventive concept be so constructed that the sleeping pens, if necessary in various lengths, are arranged individually, in a circle or in a row adjacent to one another or behind one another. The circular arrangement is particularly advantageous with pigs, since the head of the animal located in the open then comes to lie in the centre of the circular arrangement of the sleeping pens and the head requires less space than the body.

In any event, it should always be ensured that in the sleeping pen only as much space is made available as is just required for the respective animal of corresponding size in order to achieve the results sought by the invention. Both the length and also the width of the sleeping pen should thus be adapted to the requirements of the respective animal. In addition, the side walls and the cover of the pen can be adapted to the animals by adjustment, for example infinitely variable adjustment, of the size relationships. By such dimensional changes, the requirements of the respective animal can be met. In this connection, it must be ensured that each animal adopts its own position in such manner that the body can lie in the warm part of the sleeping pen and the head can lie in the open, thus outside the warm region. Direct placing of the animals one behind the other is not sensible since then the head would come to lie in the warm region and the inhalation air would likewise be warm. With smaller animals, only a smaller sleeping region has to be adjusted in temperature and only with larger animals a larger region to the extent that rehousing of the animal is not undertaken.

For ventilation of the arrangement, according to a principle of the invention, fresh air is supplied outside the sleeping pens over a wide front so that the animal can move its nose outwardly through the opening into the sleeping pen, where fresh inhalation air is available throughout.

For control of the ventilation, or of the inhalation and/or exhalation, or head air outside the sleeping pen, according to another development of the inventive concept, the arrangement can be provided with devices of various construction referred to in the following briefly as breathing boxes.

With neighbouring sleeping pens, such a breathing box extends along the pens in a channel shape and is thus a common device for these pens.

The inhalation region can be assigned to the sleeping pen in the form of at least one breathing box. According to a variation, the breathing boxes can be arranged beneath the inhalation region and be provided with an air permeable cover. According to a further constructional variation of the breathing boxes, at least one air discharge channel and/or feed channel can be provided therein. In these breathing boxes, the discharge and supply air channels can be provided substantially adjacent to one another, the discharge air channel being arranged at a smaller spacing from the opening in the sleeping pen than the air supply channel. It is also of an advantage if the air discharge channel is connected to a lateral channel and/or a floor channel. Thus it can for example be prevented that during extraction of the breathing air along the air discharge channel no draught forms across the cover if the breathing air is withdrawn also in the sides and floor channels which are open towards the exhaust channel but are otherwise closed, as well as through the discharge channel. As a further construction of the inhalation air region of the arrangement, a baffle plate can be provided above the breathing box for deflecting the inlet air in order to improve the air flow conditions further in the inhalation region.

According to another possibility of the inventive concept, a downwardly air-permeable breathing box can be arranged above the inhalation region. In this breathing box, the air supply channel can be arranged in the vicinity of the opening and the discharge air channel can be arranged on the side of the air supply channel facing away from the opening. Such a breathing box can furthermore be so constructed that between the opening and the supply channel for the introduction of head air of controlled temperature, a head air channel is provided. According to a further embodiment of the inventive concept, above the inhalation region, a breathing box with an air supply channel can be provided and beneath the inhalation region a further breathing box with an air discharge channel can be provided. The lower side of this air supply channel can be constructed as an outlet for the supplied air in such manner that the supplied air flows downwardly along the curtain. Furthermore, on the lower air outlet side of this air supply channel, narrow air outlet slots, holes, bores or the like can be provided. It is of advantage where the slot is sufficiently wide that the air flow is laminar.

Even during the day, the temperature of the re-circulated air, for example between eight and eleven o'clock, can be reduced if the pigs are very active, in order to save energy (in order to maintain the current consumption low).

According to a further development of the inventive concept, in an arrangement with a plurality of sleeping pens, in one pen fresh air for all sleeping pens can be supplied from the pen cover into the inhalation regions and the discharge air can be extracted through discharge channels located in underfloor breathing boxes.

Finally, during growth of the animals, the temperature of the re-circulated air in the sleeping pens can be adapted to the requirements of the animals. The temperature is in this connection reduced in stages in order for example to adapt new-born piglets to the lower environmental temperatures during the first phases of development.

The subject matter of the invention will be described in more detail in the following on the basis of the exemplary embodiments illustrated in the drawings, in which.

Figure 1:
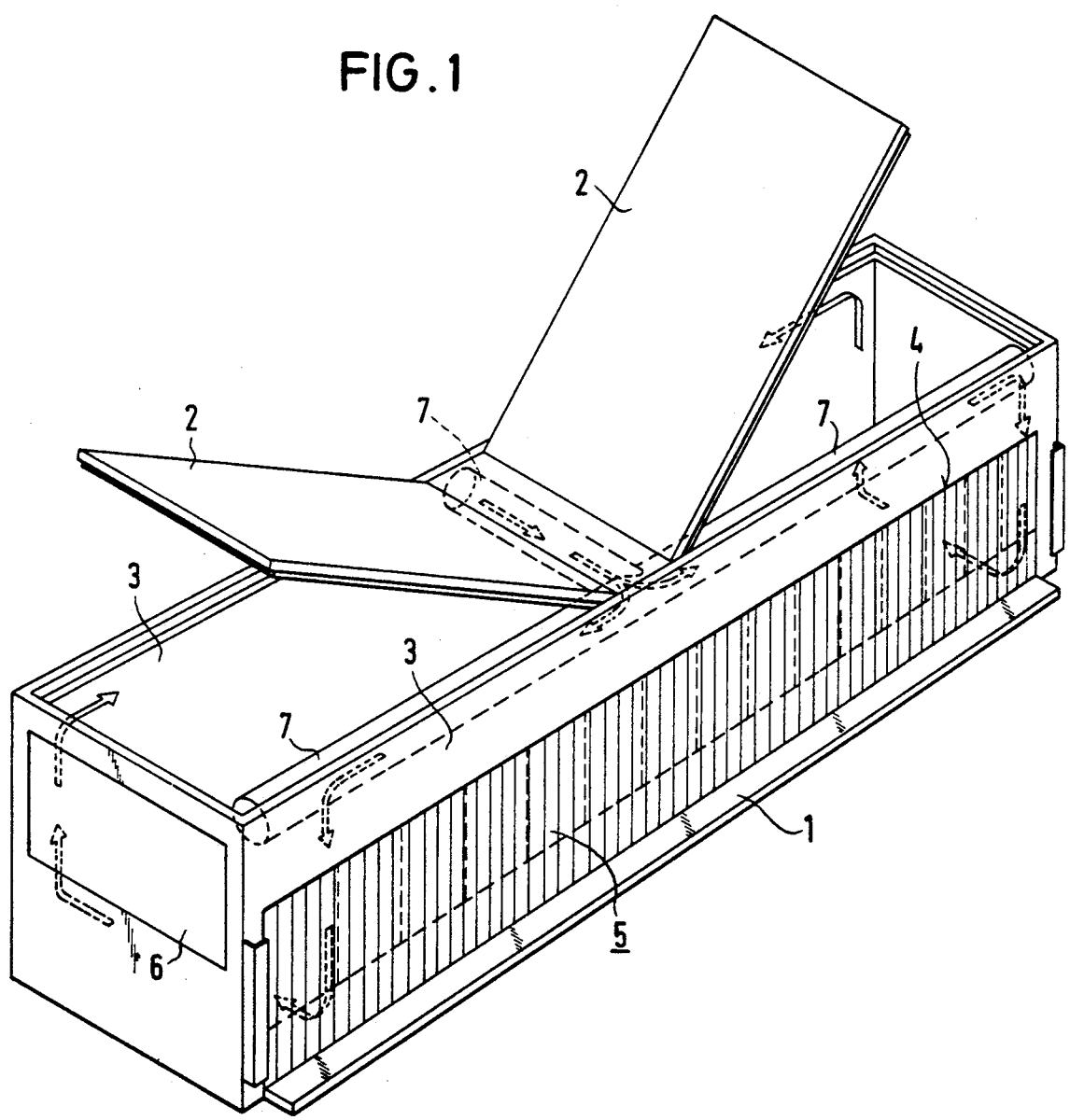
FIG. 1 shows a perspective view of a sleeping pen according to the invention.

FIG. 1 shows an exemplary embodiment of a sleeping pen of the arrangement according to the invention. The sleeping pen consists of a floor 1, a sub-divided and pivotable cover 2, side walls 3 and an easily opened and closed flap 6 provided on one end of the sleeping pen. In order to prevent loss of heat, the structural elements 1, 2, 3 and 6 can be insulating components. This sleeping pen has furthermore at least one opening 4 which is covered by a single or multiple curtain 5. For circulation of warm re-circulated air, the sleeping pen is provided with an air distributor tube 7. Warm air is sucked in through a heating device and is blown out through the air distributor tube 7 into the body region.

Figure 2:
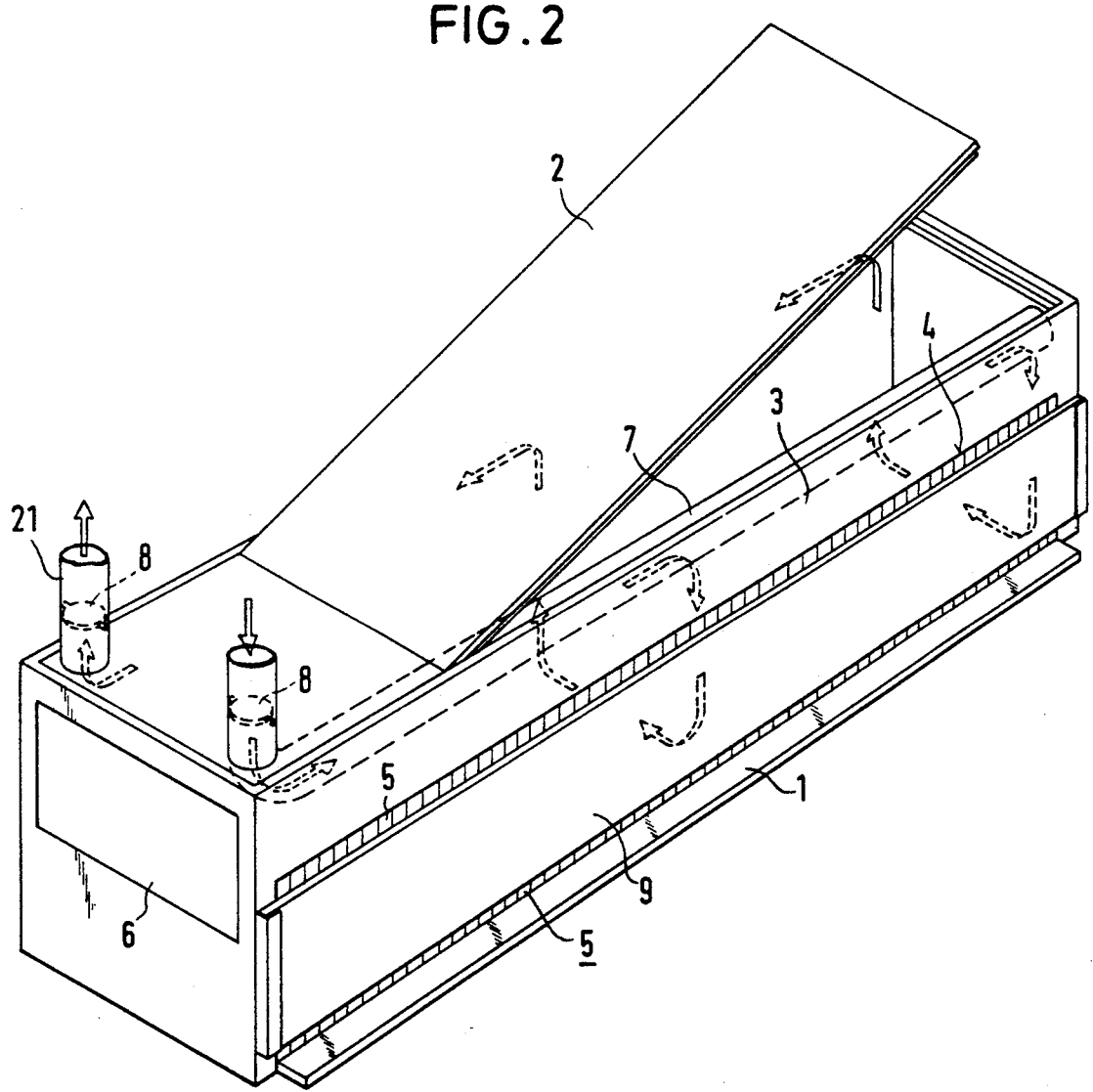
FIG. 2 shows a perspective view of a second exemplary embodiment of the sleeping pen according to FIG. 1.

FIG. 2 illustrates a further exemplary embodiment of the sleeping pen shown in FIG. 1. This sleeping pen has an air distributor tube 7 and an air discharge tube 21 through which the re-circulated air is driven into the body region of the animal. The air distributor tube 7 and the air discharge tube 21 are provided with a simple flap 8, which can be controlled manually or by means of automatic control technology. The opening 4 of the sleeping pen can be closed by means of a simple board 9.

Figure 3:
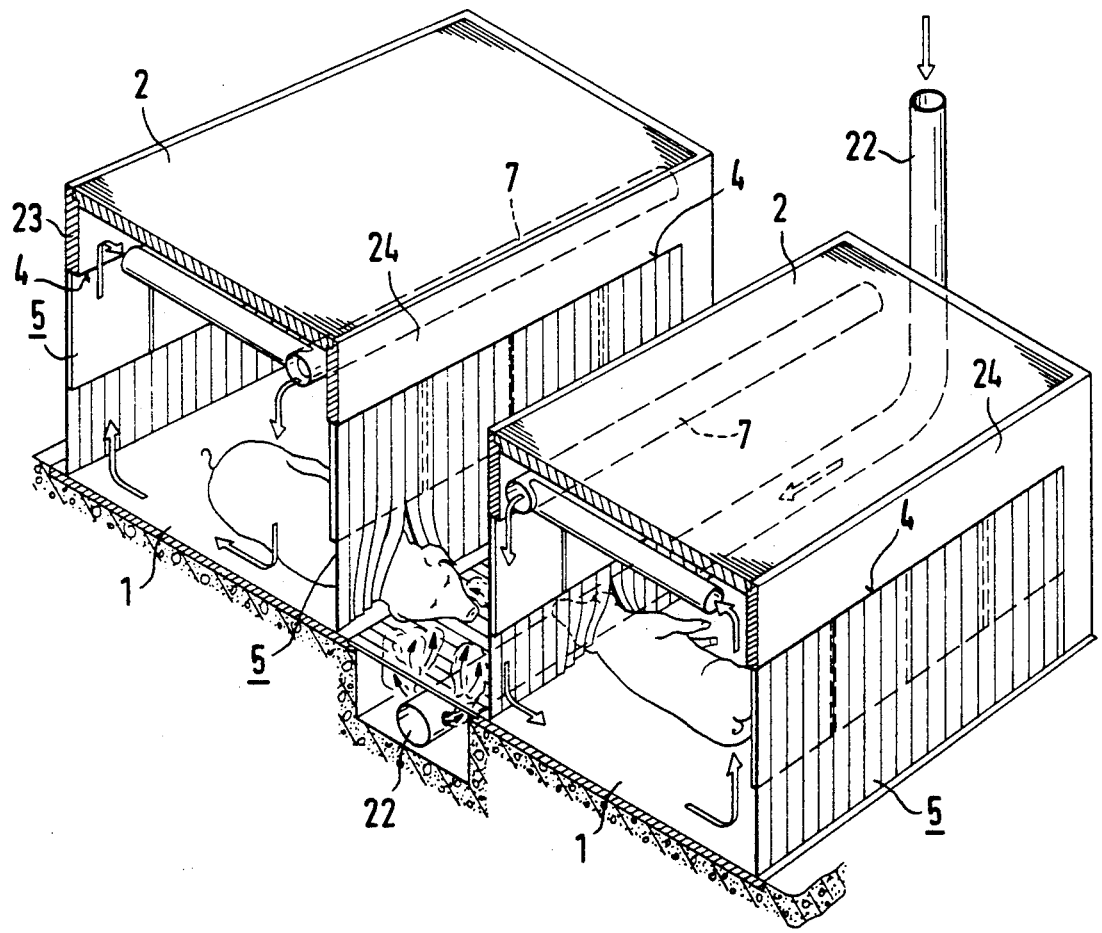
FIG. 3 shows a schematic perspective view of two adjacent sleeping pens which are arranged in an inhalation air region.

FIG. 3 shows an arrangement with opposed sleeping pens, as illustrated in FIGS. 1 or 2, and an inhalation region to which inhalation air is supplied through an air inlet tube 22. The illustrated openings 4 in the walls 23 and 24 can be provided with curtains 5 consisting of lamellas, in order to enable entry and exit of the animals.

Figure 4:
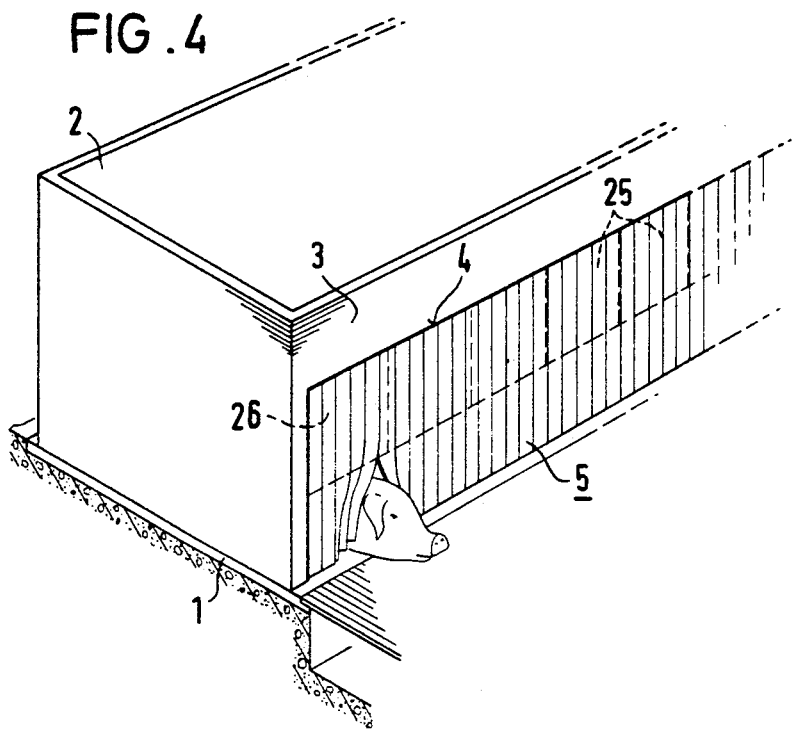
FIG. 4 shows a schematic perspective view of an embodiment of a curtain consisting of lamellas.

FIG. 4 shows a curtain 5 consisting of multiple lamellas of various heights and widths. The shorter and broader lamellas 25 hang vertically above the head of the animal when the animal is lying, whilst this is located between the narrower and longer lamellas 26 which lie close to the head. Thus it is ensured that losses of warm air through the curtains 5 are prevented.

Figure 5:
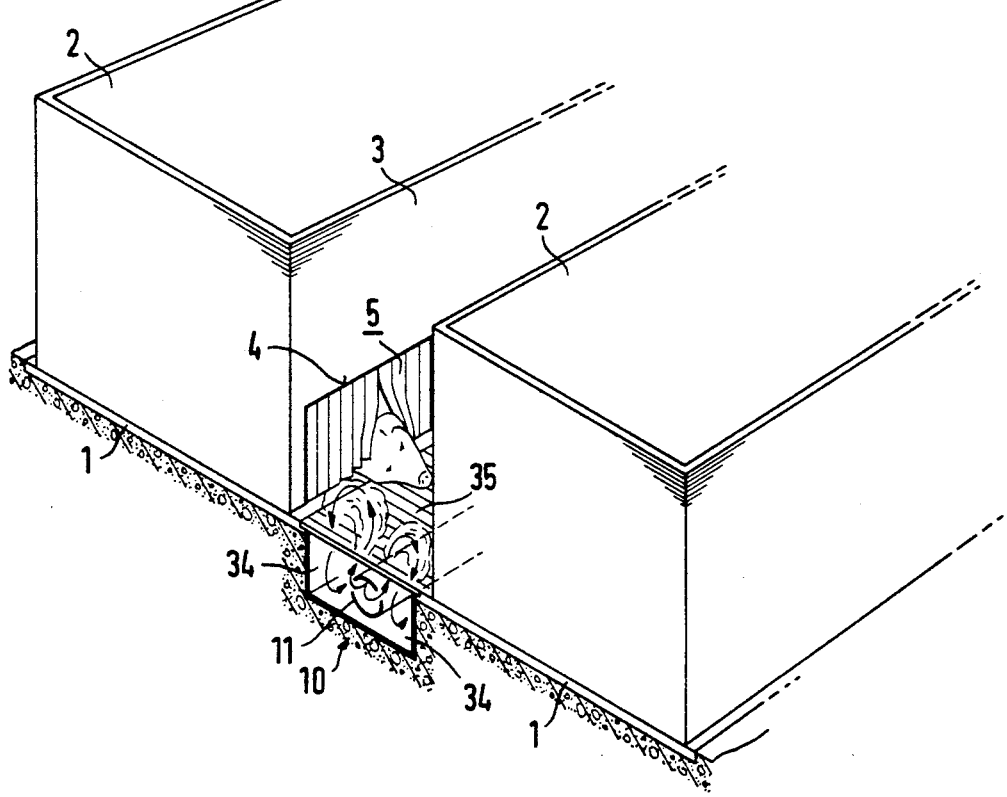
FIG. 5 shows a schematic perspective view of an arrangement provided with a breathing box.

FIG. 5 shows a device for contolling the air surrounding the head region of the animal or pig, referred to in the following as a breathing box for brevity. The breathing box 10 has an inlet 11 for processed inlet or inhalation air as well as a discharge channel 34 for exhausting of breathing air discharged by the animal. This breathing box 10 is provided on its upper side with an air permeable cover 35.

Figure 6:
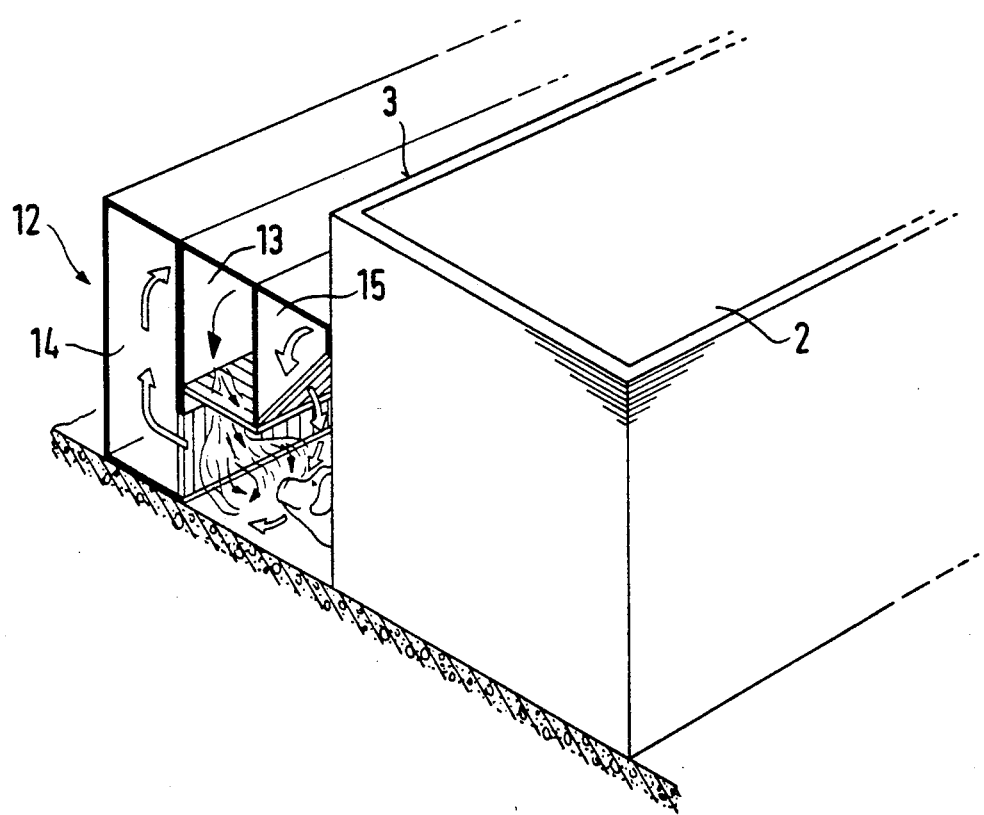
FIG. 6 shows a schematic perspective view of an arrangement provided with a breathing box, the breathing box having an air supply channel, an air discharge channel and a head air channel.

FIG. 6 shows another exemplary embodiment of a breathing box 12. This has on its upper side an inlet 13 for the breathing air, a discharge channel 14 through which the discharge of air consumed by the animal takes place, as well as a head air channel 15 through which head air is supplied.

Figure 7:
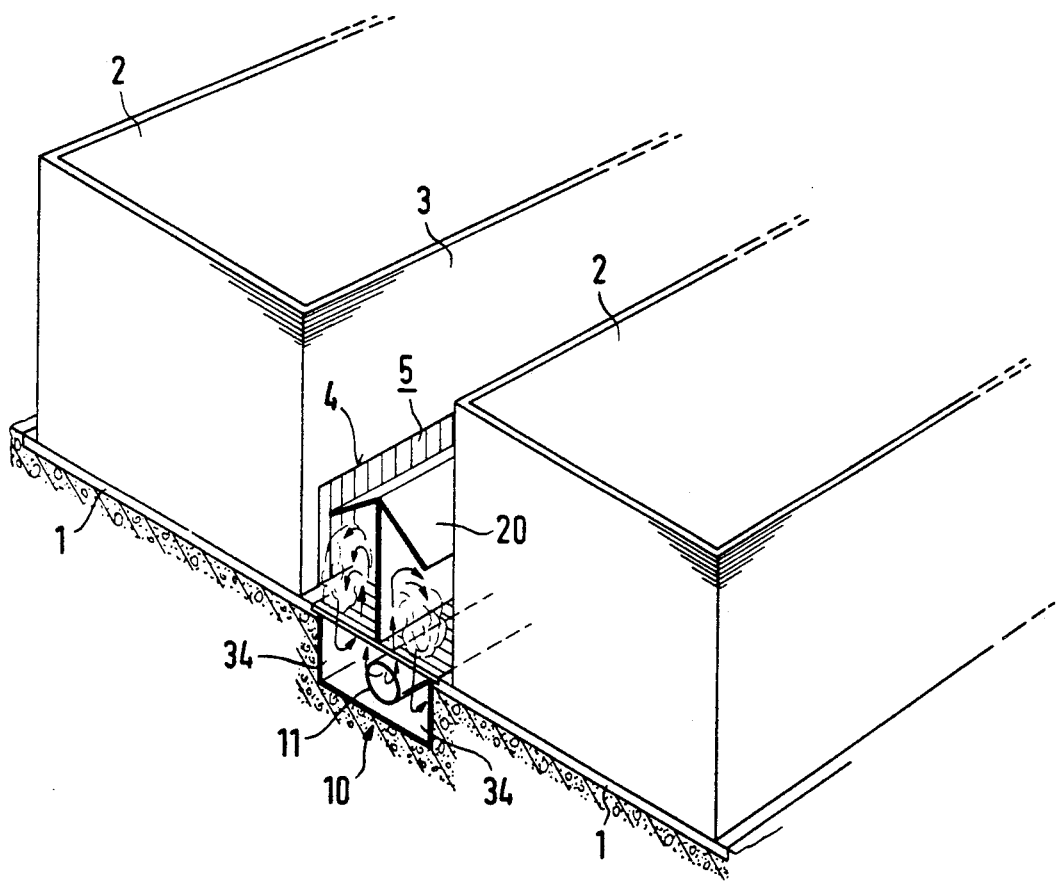
FIG. 7 shows a schematic perspective view of an arrangement according to FIG. 5, the breathing box of which is provided with a baffle plate.

FIG. 7 illustrates an arrangement having a breathing box according to FIG. 5, in which the breathing box 10 is equipped with a baffle plate 20. By means of this baffle plate 20, the inlet air 11 is deflected and the discharge air, as shown in FIG. 7, can be sucked out more favourably.

Figure 8:
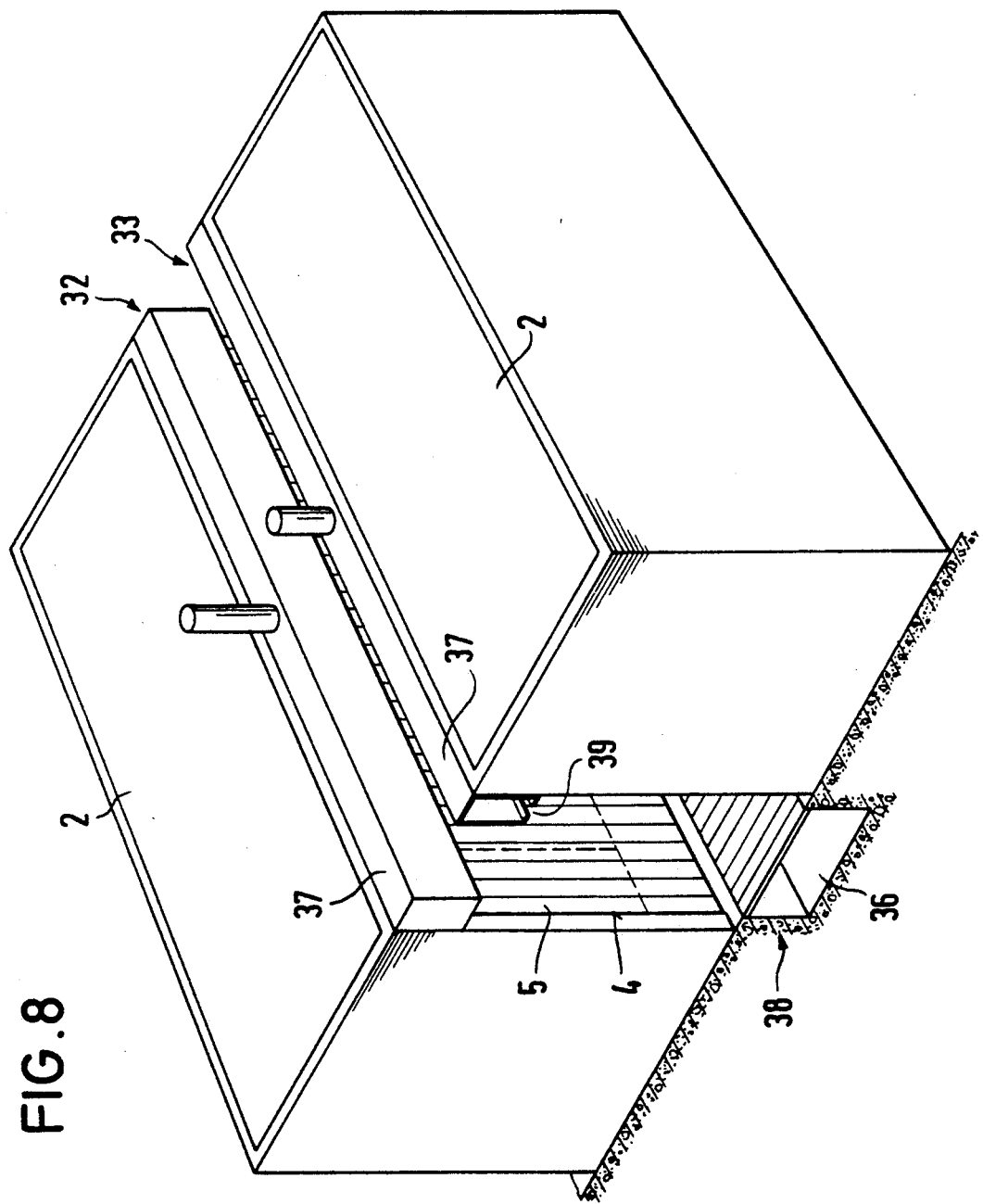
FIG. 8 shows a schematic perspective view of an arrangement provided with breathing boxes, in which one breathing box is provided with an air supply channel above the inhalation region and a further breathing box is provided with an air discharge channel beneath the inhalation region.

FIG. 8 shows a breathing box 32 above the inhalation region. The inhalation air is guided via an air supply channel 37 from above by means of the Coanda effect along the lamellas downwardly across the heads and noses of the animals in order then to be extracted through a breathing box 38 illustrated with an air discharge channel 36. Furthermore, above the inhalation region, a breathing box 33 is illustrated which has for example a narrow slot 39 provided on the lower side of the air supply channel 37.

The air outlet openings of the breathing boxes can moreover be freely adapted to the requirements of air guidance.

Figure 9:
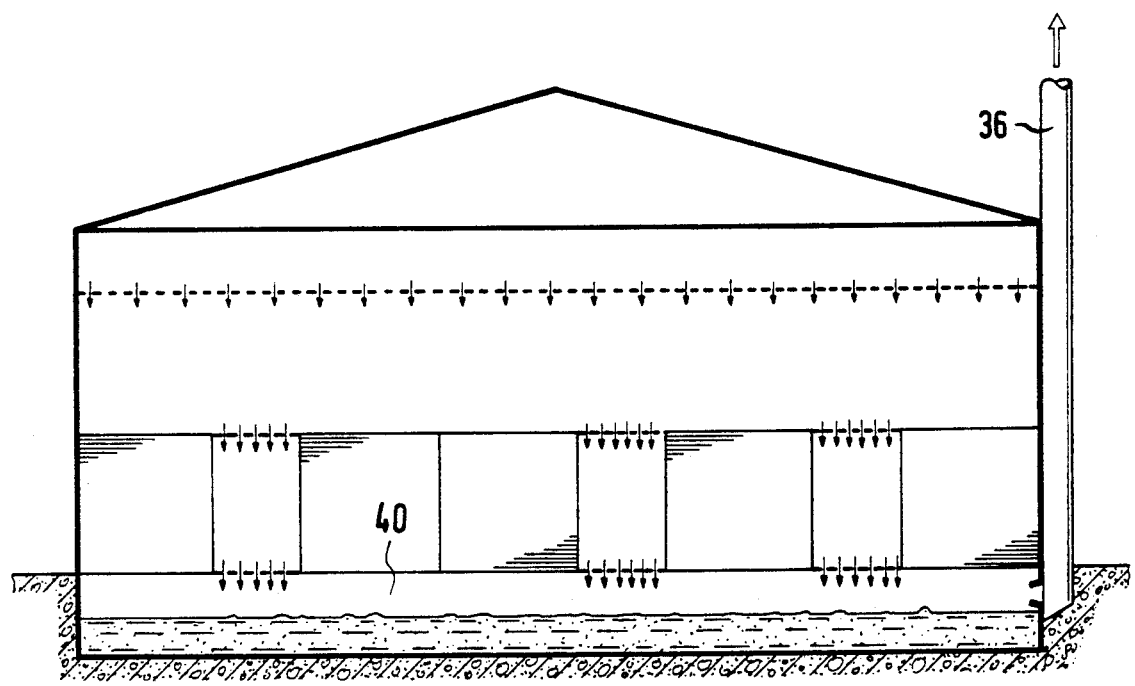
FIG. 9 shows a schematic cross-section through an arrangement in which the fresh air supply is so controlled that the entire stall air between the sleeping pens is introduced as fresh breathing air and is extracted by an underfloor suction device; and Fig . 10 shows a plan view of a circular arrangement of several sleeping pens.

FIG. 9 illustrates an arrangement having a plurality of sleeping pens. This arrangement has a fresh air supply on the stall cover, via which the entire stall air is guided as fresh air between the sleeping pens or into the inhalation region across the heads and noses of the animals, in order then to be extracted by underfloor suction means 40. This supply of fresh air can for example be achieved by means of a trickle cover, known per se, providing uniform distribution of the air through all sleeping pens.

Figure 10:
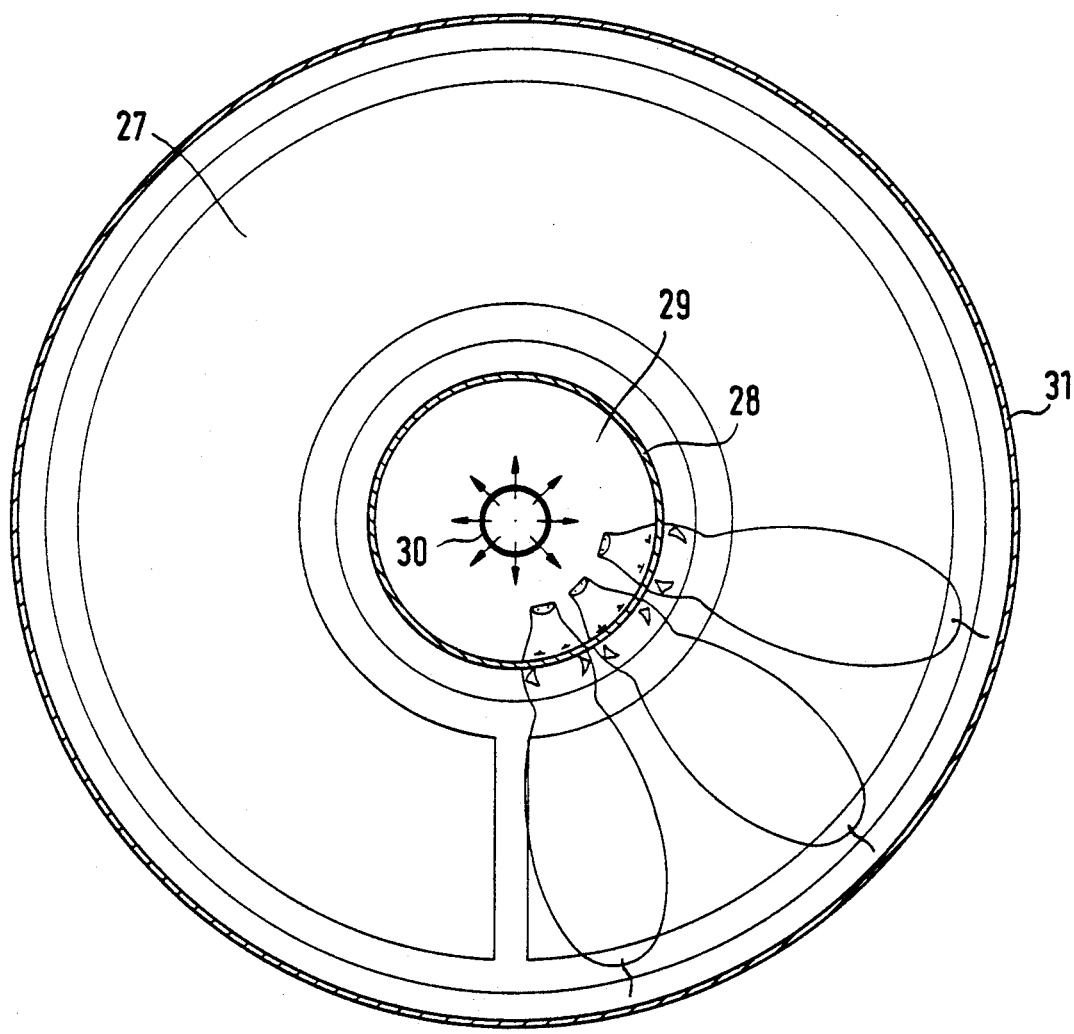

FIG. 10 shows a circular arrangement consisting of a plurality of sleeping pens. It is particularly suitable for pigs. The wide bodies of the pigs are positioned in the body region 27 of the arrangement and the heads of the pigs are in each case moved through an opening covered with a lamella curtain in the inner wall 28 of the arrangement into the inhalation region 29, to which fresh breathing air is supplied through an air supply tube 30. The pig is enabled to move in and out into or out of the pen through an opening in the outer wall 31 covered with a lamella curtain.

What is claimed is:

1. A sleeping arrangement for a relatively long and narrow animal or animals of predetermined height, length and width dimensions, such as pigs, said arrangement comprising:

at least one sleeping pen for receiving at least one animal, said sleeping pen having a substantially imperforate floor forming a bed for receiving the animal or animals in a prone position;

said floor having a length between opposite ends thereof and a width between opposite sides thereof, one of said ends being a front end and the other of said ends being a rear end and said length being at least substantially equal to the length or lengths of the animal or animals received in said pen;

a pair of spaced sidewalls upstanding at said sides of said floor, said sidewalls being spaced apart by a distance substantially equal to the width or widths of the animal or animals to be received in said pen whereby each animal is encouraged to assume a position in said pen with its length extending in the length direction of said floor;

said pen also having a cover above said floor and extending between the upper ends of said sidewalls remote from said floor, said cover being spaced from said floor by a distance at least substantially equal to the height of the animals to be received in the pens;

said pen having a front wall at said front end of said floor and a rear wall at said rear end of said floor, each said front wall and said rear wall extending between said side walls and substantially at least from said floor to said cover to provide an enclosure with an interior separated from the atmosphere for air flow and for receiving the animal or animals;

at least one of said front wall and said rear wall having, at least in part, the from of flexible curtain means permitting the animal or animals to enter and leave the enclosure by parting the curtain and permitting the animal or animals to sleep on said floor in said enclosure with at least the nose portion of the animal or animals extending from the enclosure and to inhale air exterior of the enclosure at a temperature different from said interior of said enclosure without restraining the animal or animals with respect to departure from said enclosure; and air supply means for supplying air to said interior of said enclosure.

2. A sleeping arrangement as set forth in claim 1 wherein said air supply means comprises heating means for providing air to said interior of said enclosure at a temperature above the temperature of the air around said enclosure.

3. A sleeping arrangement as set forth in claim 1 wherein said air supply means comprises air recirculating means for removing air from said enclosure and redelivering the last-mentioned said air to said enclosure.

4. A sleeping arrangement as set forth in claim 3 wherein said air recalculating means comprises control means for controlling the air recirculated.

5. A sleeping arrangement as set forth in claim 1 wherein said floor, said sidewalls and said cover are made of heat insulating material.

6. A sleeping arrangement as set forth in claim 1 wherein said floor includes a base with a covering of a material softer than the material of said base.

7. A sleeping arrangement as set forth in claim 1 wherein said cover is openable and closable to permit access to the interior of said enclosure.

8. A sleeping arrangement as set forth in claim 1 wherein said curtain means comprises a plurality of vertically suspended, adjacent lamellas.

9. A sleeping arrangement as set forth in claim 8 wherein said curtain means comprises two sets of lamellas, an upper set and a lower set, the lamellas of said upper set being wider in the horizontal direction than the lamellas of said lower set and the lower ends of the lamellas of said upper set being above the lower ends of said lower set.

10. A sleeping arrangement as set forth in claim 1 further comprising breathing air means adjacent to at least said one of said front wall and said rear wall but exterior of said enclosure for supplying inhalation air to the animal or animals.

11. A sleeping arrangement as set forth in claim 10 wherein said breathing air means comprises air supply means and air removal means for delivering air to space adjacent said one of said first wall and said rear wall and for removing air from said space.

12. A sleeping arrangement as set forth in claim 11 wherein the last-mentioned said air supply means is above and vertically spaced from said air removal means.

13. A sleeping arrangement as set forth in claim 12 wherein the last-mentioned said air supply means is a duct connected to a source of air above atmospheric pressure, said duct opening downwardly.

14. A sleeping arrangement as set forth in claim 13 wherein said air removal means comprises a duct opening other than in the downward direction.

15. A sleeping arrangement as set forth in claim 14 wherein said duct of said air removal means opens transversely to said downward direction.

16. A sleeping arrangement as set forth in claim 14 wherein said duct of said air removal means opens upwardly.

17. A sleeping arrangement as set forth in claim 12 wherein said air removal means is closer to said floor than said air supply means.

18. A sleeping arrangement as set forth in claim 1 further comprising air removal means for removal of air from space adjacent said one of said front wall and said rear wall.

19. A sleeping arrangement as set forth in claim 18 wherein said air removal means comprises a duct with an air permeable cover adjacent said floor.

20. A sleeping arrangement as set forth in claim 19 further comprising a baffle above and spaced from said air permeable cover for defining said space and thereby limiting the space from which air is to be removed.

21. A sleeping arrangement as set forth in claim 18 wherein said air removal means comprises a duct with an air permeable cover spaced from and facing said one of said front wall and said rear wall.

22. A sleeping arrangement as set forth in claim 1 wherein there are a plurality of sleeping pens adjacent to each other.

23. A sleeping arrangement as set forth in claim 22 wherein the last-mentioned said air supply means is common to all said pens.

24. A sleeping arrangement as set forth in claim 1 wherein said front wall and said rear wall lie in a substantially rectilinear and parallel plane.

25. A sleeping arrangement as set forth in claim 1 wherein said front wall lies in a circular plane.

26. A sleeping arrangement as set forth in claim 1 wherein there are a plurality of sleeping pens adjacent to each other and further comprising a stall cover at least over said one of said front wall and said rear wall of said pen, breathing air means for supplying fresh air beneath said stall cover for all sleeping pens and air removal means substantially at the level of said floors for removing air from the space adjacent said one of said front wall and said rear wall of all said pens.

27. A sleeping arrangement as set forth in claim 1 wherein there are a plurality of sleeping pens disposed with said one of said front wall and said rear wall of at least one of said pens spaced from and facing said one of said front wall and said rear wall of another of said pens and further comprising air removal means for removing air from the space between the last-mentioned said one wall and the last-mentioned said another wall.

28. A sleeping pen as set forth in claim 27 further comprising breathing air supply means for supplying inhalation air to the last-mentioned space in spaced relation to said air removal means.

* * * * *